US009997746B1

(12) United States Patent
Lim et al.

(10) Patent No.: US 9,997,746 B1
(45) Date of Patent: Jun. 12, 2018

(54) BATTERY PACKAGE STRUCTURE

(71) Applicant: Amazon Technologies, Inc., Seattle, WA (US)

(72) Inventors: James Robert Lim, San Jose, CA (US); David Eric Peters, San Jose, CA (US); Ramez Nachman, San Francisco, CA (US); Christopher Thomas Li, Mountain View, CA (US); Stewart Robin Shearer, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 364 days.

(21) Appl. No.: 14/678,773

(22) Filed: Apr. 3, 2015

(51) Int. Cl.
| H01M 2/02 | (2006.01) |
| H01M 2/08 | (2006.01) |
| H01M 6/02 | (2006.01) |
| H01M 10/04 | (2006.01) |
| C25D 1/00 | (2006.01) |
| B65B 11/00 | (2006.01) |
| B65B 55/00 | (2006.01) |

(52) U.S. Cl.
CPC .......... *H01M 2/0285* (2013.01); *B65B 11/00* (2013.01); *B65B 55/00* (2013.01); *C25D 1/00* (2013.01); *H01M 2/028* (2013.01); *H01M 2/0287* (2013.01); *H01M 6/02* (2013.01); *H01M 10/0436* (2013.01); *H01M 2002/0297* (2013.01); *H01M 2220/30* (2013.01)

(58) Field of Classification Search
CPC ... H01M 2/021; H01M 2/0212; H01M 2/0275
See application file for complete search history.

(56) References Cited

U.S. PATENT DOCUMENTS

| 2008/0107963 A1* | 5/2008 | Lee ..................... H01M 2/0275 429/174 |
| 2015/0155530 A1* | 6/2015 | Takahashi .......... H01M 2/0275 429/127 |
| 2016/0043359 A1* | 2/2016 | Miyake ............... H01M 2/0237 429/90 |

* cited by examiner

*Primary Examiner* — Stephan Essex
(74) *Attorney, Agent, or Firm* — Lee & Hayes, PLLC

(57) ABSTRACT

An apparatus comprises an electrochemical energy storage device, a non-conductive film at least partially covering the electrochemical energy storage device, and a nano-grain metallic film at least partially covering the non-conductive film. The electrochemical energy storage device may include a cathode electrode layer, an anode electrode layer, and a separator layer therebetween.

16 Claims, 7 Drawing Sheets

BATTERY PACKAGE STRUCTURE

BACKGROUND

Portable electronic devices such as electronic book ("eBook") readers, cellular telephones, smart phones, media players, tablet computers, wearable computers, laptop computers, and netbooks, for example, are becoming increasingly prevalent with advances in technology and miniaturization. Important elements of portable electronic devices are the batteries that provide power to the devices. A battery generally comprises one or more electrochemical cells assembled in a self-contained package.

Because batteries are generally among the largest of components of which a portable electronic device is comprised, there are continuing efforts to design and produce battery packaging materials that are thinner, provide improved volumetric energy densities and form factors, provide improved safety and reliability, and reduce needs for "shielding" materials around the battery package.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In various embodiments described herein, battery packages, such as those used in portable electronic devices, include nano-grain metallic films and/or structures. Battery packages may include one or more electrochemical cells enclosed by an enclosure comprising one or more layers or films of various materials. Such materials may include, for example, nano-grain metallic films, nylon, aliphatic polyamides and thermoplastic materials and/or composites thereof. The enclosure performs a number of roles, such as protecting the electrochemical cells from moisture, oxidizing agents, physical shock, punctures, electrical shorts, and so on. On the other hand, the enclosure performs a number of additional roles, such as protecting entities (e.g., people, neighboring electrical components, etc.) from chemical, electrical, thermal, or explosive events of which electrochemical cells are capable.

In some embodiments, electrochemical cells are wrapped and hermetically sealed by the enclosure. For example, electrochemical cells may be inserted into a pouch that is subsequently sealed. The pouch may comprise a number of layers or films including one or more nano-grain metallic films. In other embodiments, portions of the enclosure are formed onto the electrochemical cells. For example, a nano-grain metallic film may be electroformed onto a polymer film that encloses electrochemical cells.

Embodiments described herein involve nano-grain metals, which may be in the form of a film or other thin layer. Such metals may comprise any of a number of elements or combinations (e.g., alloys) thereof. For example, thickness of nano-grain metallic films may be in a range from about 5 microns up to about 250 microns or more. Nano-grain metals may have grain sizes in the order of nanometers, in contrast to "normal" (e.g., metals not considered to be nano-grain metals) metals, which generally have grain sizes in the order of micrometers or larger. For example, grain size of nano-grain metals may be in a range from about 10 nanometers up to about 50 nanometers. Of course, particular values or ranges of thicknesses and grain sizes mentioned herein are merely examples, and claimed subject matter is not limited in this respect. Individual grains of nano-grain metals may comprise a crystalline structure.

Embodiments described involve electrochemical energy storage devices, herein referred to as a battery. Generally, a battery is a device including one or more electrochemical cells that convert stored chemical energy into electrical energy (and vice versa for a rechargeable battery). Each cell contains a positive terminal, or cathode, and a negative terminal, or anode. Electrolytes allow ions to move to and from each of the electrodes, allowing current to flow out of the battery, via terminals, to perform work.

Figure 1:
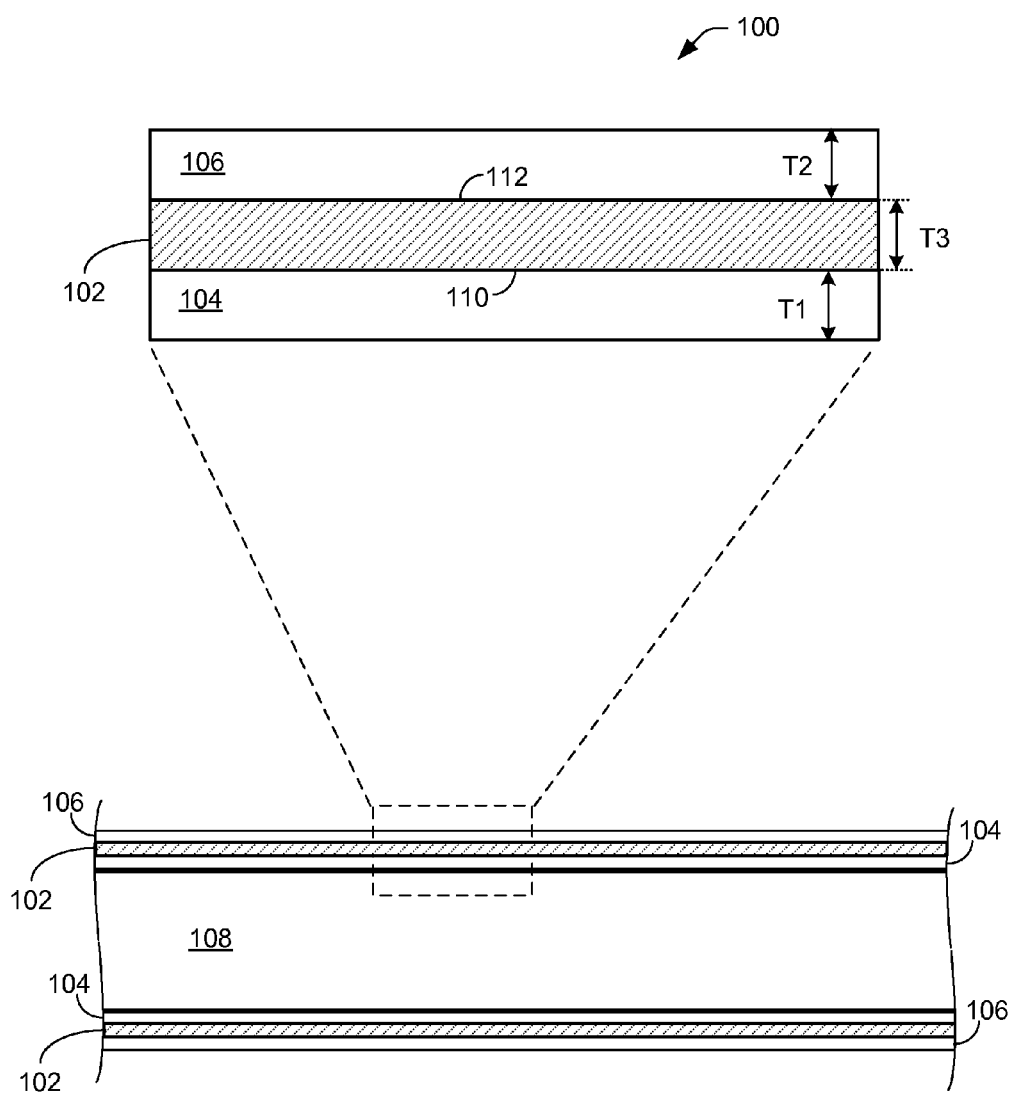
FIGS. 1 and 2 illustrate cross-sections of battery packaging material that includes a nano-grain metallic film, according to some embodiments.

FIG. 1 illustrates a cross-section of battery packaging material 100 that includes a nano-grain metallic film 102 between a first non-conductive film 104 and a second non-conductive film 106, according to some embodiments. For example, in some implementations, one or both of the first and second non-conductive films may comprise a polymer, ceramic, or cellulose-based (e.g., paper) material, just to name a few possibilities. Hereinafter, for sake of illustration, first non-conductive film 104 and a second non-conductive film 106 are referred to as first polymer film 104 and a second polymer film 106.

Battery packaging material 100 may surround and enclose a battery 108 (e.g., or battery cell), as illustrated in the lower portion of the figure. For example, in some implementations, a pouch into which battery 108 is inserted may comprise packaging material 100. In other implementations, packaging material 100 may be in the form of a sheet that is wrapped around battery 108 and sealed to enclose the battery. Packaging material 100 performs a number of roles, such as protecting the enclosed battery from moisture, oxidizing agents, gases, physical shock, punctures, electrical shorts, and so on.

First polymer film 104 is adjacent to battery 108, and facing an inside environment, whereas second polymer film 106, which may be nonconductive, faces away from the battery and toward an outside environment. In some implementations, first polymer film 104 may comprise a material that is relatively tough, flexible, and chemically resistant to an electrolyte of the battery. Such a material may comprise a polypropylene film, for example. In some implementations, second polymer film 106 may comprise a material having desirable barrier properties for preventing oxygen, water, and various particulates from reaching the enclosed battery. Second polymer film 106 may be used as a protective layer against abrasion (scratches), punctures, and tears, and may also be used as a printable surface for labeling. Such a material may comprise an aliphatic polyamide (e.g., nylon) film, for example.

Nano-grain metallic film 102 comprises a nano-grain metal or metallic alloy, which may include, among other things, chromium, copper, nickel, titanium, aluminum, and cobalt, or combinations thereof. For example, an alloy of nickel and cobalt (Ni—Co) may be manufactured into a nano-grain foil or film. Though first polymer film 104 and second polymer film 106 act as barriers that prevent undesirable material (e.g., oxygen, moisture, etc.) from reaching the enclosed battery, nano-grain metallic film 102 may also contribute to blocking oxygen and moisture ingress to the enclosed battery.

In some example embodiments, a thickness T1 of first polymer film 104 and a thickness T2 of second polymer film 106 may be in a range from about 10 microns up to about 50 microns. Thickness T3 of nano-grain metallic film 102 may be in a range from about 10 microns up to about 50 microns. For sake of comparison, in some configurations, a 25 micron thick nano-grain Ni—Co film may have strength (e.g., puncture resistance, impact strength, tensile strength, etc.) similar to that of 50 micron thick aluminum film. In some implementations, nano-grain metallic film 102 may have a thickness of about 25 microns, which may provide sufficient strength for a number of applications. In other implementations, nano-grain metallic film 102 may have a thickness of about 50 microns, which may provide relatively high strength for a number of particular applications. In still other implementations, nano-grain metallic film 102 may have a thickness of about 15 microns, which may provide sufficient strength with a relatively thin profile for a number of particular applications. In other words, particular thickness of nano-grain metallic film 102 may be used depending, at least in part, on the application.

In some embodiments, an interface 110 between nano-grain metallic film 102 and first polymer film 104 may include an adhesive. An interface 112 between nano-grain metallic film 102 and second polymer film 106 may also include an adhesive. In other embodiments, nano-grain metallic film 102 may be electroformed onto first polymer film 104. In this case, interface 108 need not include an adhesive.

Figure 2:
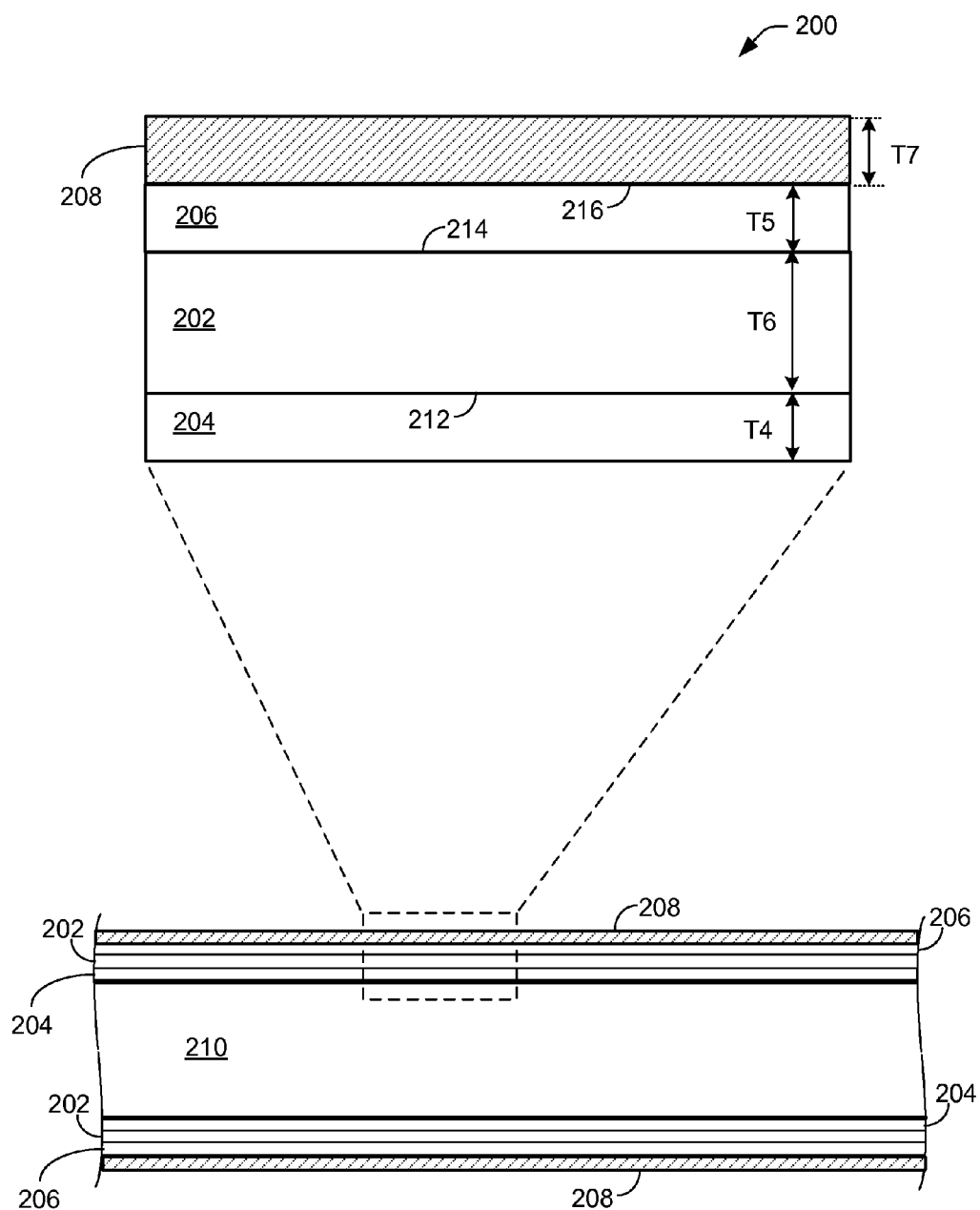

FIG. 2 illustrates a cross-section of battery packaging material 200 that includes an aluminum film 202 between a first non-conductive film 204 and a second non-conductive film 206, and a nano-grain metallic film 208, according to some embodiments. For example, in some implementations, one or both of the first and second non-conductive films may comprise a polymer, ceramic, or paper material, just to name a few possibilities. Hereinafter, for sake of illustration, first non-conductive film 204 and a second non-conductive film 206 are referred to as first polymer film 204 and a second polymer film 206.

Battery packaging material 200 may surround and enclose a battery 210 (e.g., or battery cell), as illustrated in the lower portion of the figure. For example, in some implementations, a pouch into which battery 210 is inserted may comprise packaging material 200. In other implementations, packaging material 200 may be in the form of a sheet that is wrapped around battery 210 and sealed to enclose the battery. Packaging material 200 performs a number of roles, such as protecting the enclosed battery from moisture, physical shock, punctures, electrical shorts, and so on.

Battery packaging material 200 is similar to battery packaging material 100 except, among other things, for the addition of aluminum film 202. Also, nano-grain metallic film 208 is arranged to be at the outside surface (e.g., away from the enclosed battery) of battery packaging material 200 and may be used as a printable surface for labeling.

First polymer film 204 is adjacent to battery 210, whereas nano-grain metallic film 208 faces away from the battery. In some implementations, first polymer film 204 may comprise a material that is relatively tough, flexible, and chemically resistant to an electrolyte of the battery. Such a material may comprise a polypropylene film, for example. In some implementations, second polymer film 206 may comprise a material having desirable barrier properties for preventing oxygen, water, and various particulates from reaching the enclosed battery. Second polymer film 206 may be used as a protective layer against abrasion (scratches), punctures, and tears, though nano-grain metallic film 208 contributes as such a protective layer. Second polymer film 206 may comprise a nylon film, for example.

Nano-grain metallic film 208 comprises a nano-grain metal or metallic alloy, which may include, among other things, chromium, copper, nickel, and cobalt, or combinations thereof. Though first polymer film 204 and second polymer film 206 act as barriers that prevent undesirable material (e.g., oxygen, moisture, etc.) from reaching the enclosed battery, aluminum film 202 may contribute substantially to blocking oxygen and moisture ingress to the enclosed battery.

In some example embodiments, a thickness T4 of first polymer film 204 and a thickness T5 of second polymer film 206 may be in a range from about 20 microns up to about 30 microns. Thickness T6 of aluminum film 202 may be in a range from about 40 microns up to about 60 microns. In some implementations, nano-grain metallic film 208 may have a thickness T7 of about 25 microns.

In some embodiments, an interface 212 between aluminum film 202 and first polymer film 204 may include an adhesive. An interface 214 between aluminum film 202 and second polymer film 206 may also include an adhesive. In some embodiments, nano-grain metallic film 208 may be electroformed onto second polymer film 206. In this case, an interface 216 between nano-grain metallic film 208 and second polymer film 206 need not include an adhesive.

Figure 3:
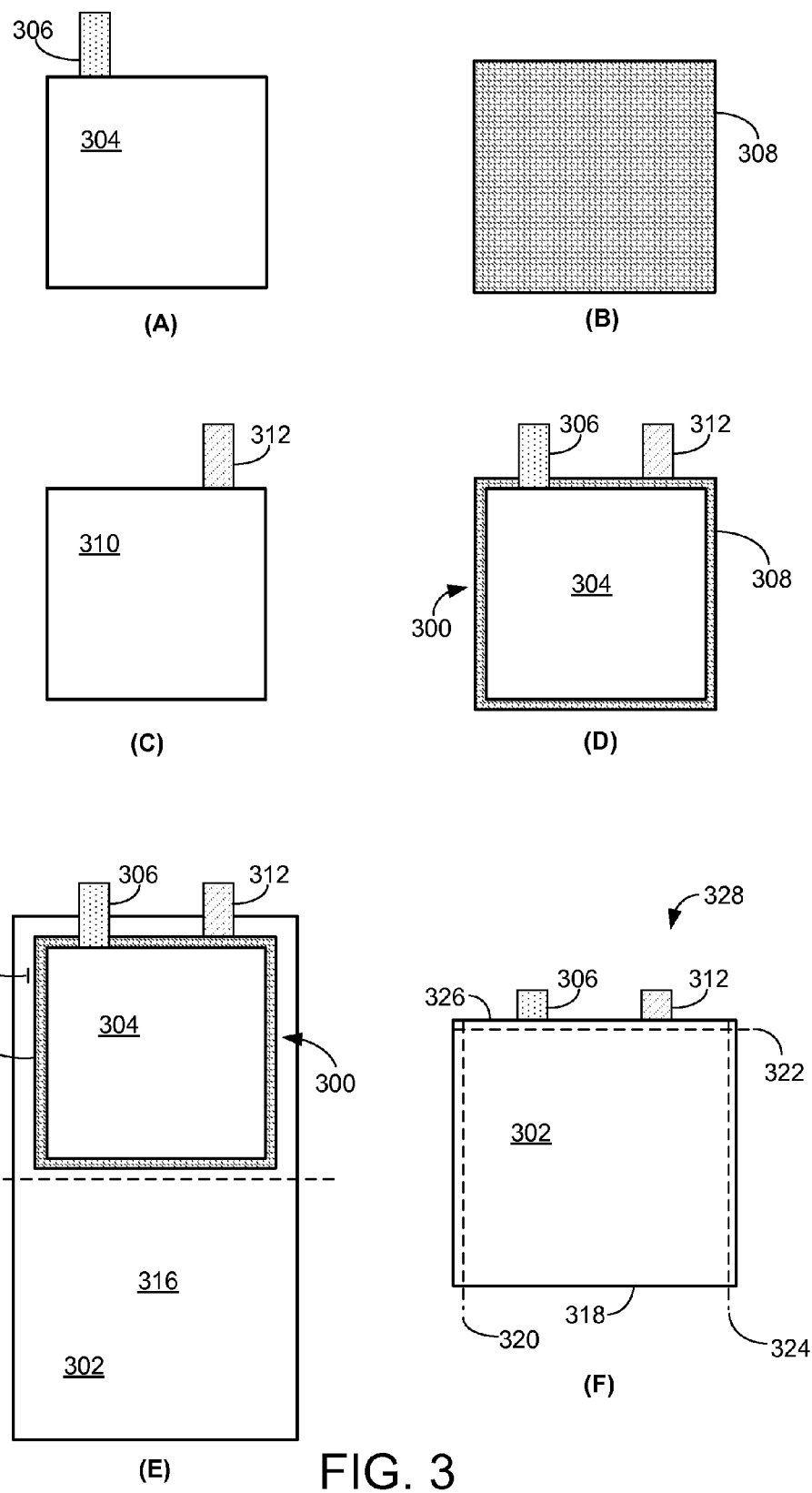
FIG. 3 illustrates a battery packaging process, according to various embodiments.

FIG. 3 is a top view of a process for assembling and packaging a battery cell 300, according to various embodiments. For example, a packaging material 302, which includes a nano-grain metallic film, may be used to enclose battery cell 300 subsequent to assembling the battery cell. Packaging material 302 may be similar to or the same as 100 or 200 illustrated in FIGS. 1 and 2, respectively.

Drawings (A)-(C) illustrate parts of battery cell 300. In particular, drawing (A) illustrates a cathode electrode 304 that includes a cathode connector 306, drawing (B) illustrates a separator layer 308, and drawing (C) illustrates an anode electrode 310 that includes an anode connector 312. Cathode connector 306 and anode connector 312 may be used to connect and provide electrical power to circuitry that may be incorporated in an electronic portable device, for example. Separator layer 308 may comprise a material capable of providing electrical insulation between cathode electrode 304 and anode electrode 310. Such a material may comprise, for example, a flexible or rigid polymer. Dimensions of cathode electrode 304, separator layer 308, and anode electrode 310 may be in the order of millimeters, centimeters, or more. In some implementations, an electrolyte solution may infiltrate within separator layer 308. In other implementations, an electrolyte may comprise a stand-alone solid-electrolyte (without need of a separator, for example).

Drawing (D) illustrates cathode electrode 304, separator layer 308, and anode electrode 310 assembled together, with separator layer 308 between cathode electrode 304 and anode electrode 310. Such an assembly may form battery cell 300. Cathode electrode 304, separator layer 308, and anode electrode 310 may be stacked upon one another without an adhesive, though an adhesive may be used to assist in securing any of the elements of the battery cell.

Drawing (E) illustrates battery cell 300, comprising cathode electrode 304, separator layer 308, and anode electrode 310, placed on a portion of packaging material 302. Edge portions 314 and a folding portion 316 remain exposed (e.g., not covered) by battery cell 300. Subsequent to the configuration illustrated in drawing (D), folding portion 316 is folded on fold line 318 and edge portions 314 may be sealed, as explained below. In some implementations, a nano-grain metallic film incorporated in packaging material 302 includes one or more fold lines, such as 318, having physical properties different from physical properties of other portions of the nano-grain metallic film. For example, the nano-grain metallic film in packaging material 302 may have larger grain sizes along fold line 318 as compared to grain sizes of the nano-grain metallic film other than the fold line. Such larger grain sizes may be rendered, for example, by a localized heat treatment applied to fold line 318 during fabrication of the nano-grain metallic film.

Drawing (F) illustrates battery cell 300 enclosed in packaging material 302 subsequent to a folding process, as described for drawing (E), for example. Subsequent to such folding, edges of packaging material 302 may be sealed along seal lines 320-324, leaving cathode connector 306 and anode connector 312 protruding through seal line 322 and extending beyond edge 326 of the battery package 328. At least a portion (e.g., a film or layer) of packaging material 302 may comprise polypropylene or other polymer, which may be heat sealed.

Figure 4:
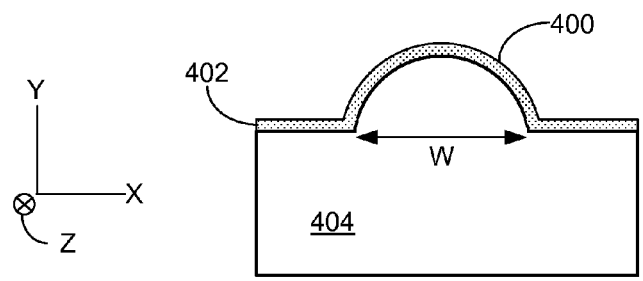
FIG. 4 is a cross-sectional view of a micro-arch of a nano-grain metallic film on a patterned substrate, according to various embodiments.

FIG. 4 is a cross-sectional view of a micro-arch 400 of a nano-grain metallic film 402 on a patterned substrate 404, according to various embodiments. Reference directions X, Y, and Z are included. The Z-direction is in and out of the drawing. A micro-arch (e.g., a series of repeated micro-arches) included in a film may provide increased strength as compared to a flat film without a micro-arch. Herein, a micro-arch refers to curvature that need not be any particular shape. Such a micro-arch may be one example of a reinforcing nano-structure, a shape of which may be semi-circular, parabolic, hyperbolic, triangular, or sawtooth, just to name a few examples. In some embodiments, a reinforcing nano-structure is a layer-strengthening structure on a nano-scale (e.g., features having dimensions smaller than about 1 micron). Though one micro-arch (400) is illustrated, nano-grain metallic film 402 may include any number of such micro-arches in a series (e.g., a series of one or more reinforcing nano-structure shapes). Such a configuration may be similar to or the same as a corrugated structure so that micro-arches of nano-grain metallic film 402 undulate across the film in the X-direction and are aligned in the Z-direction.

Micro-arch 400 may be formed by electroforming nano-grain metallic film 402 onto patterned substrate 404. The shape of micro-arch 400 may be rendered by the shape of patterned substrate 404, which may be patterned by an embossing process, for example. Patterned substrate 404 may comprise a polymer film having a though other thicknesses are possible. Nano-grain metallic film 402 may be electroformed onto patterned substrate 404 with a thickness in a range from about 15 microns up to about 50 microns, for example. A width of micro-arch 400 may be in the order of tens of microns or more. In the case of a plurality of micro-arches, each micro-arch may be separated from adjacent micro-arches by any distance along the X-axis, including zero (no separation between micro-arches).

Figure 5:
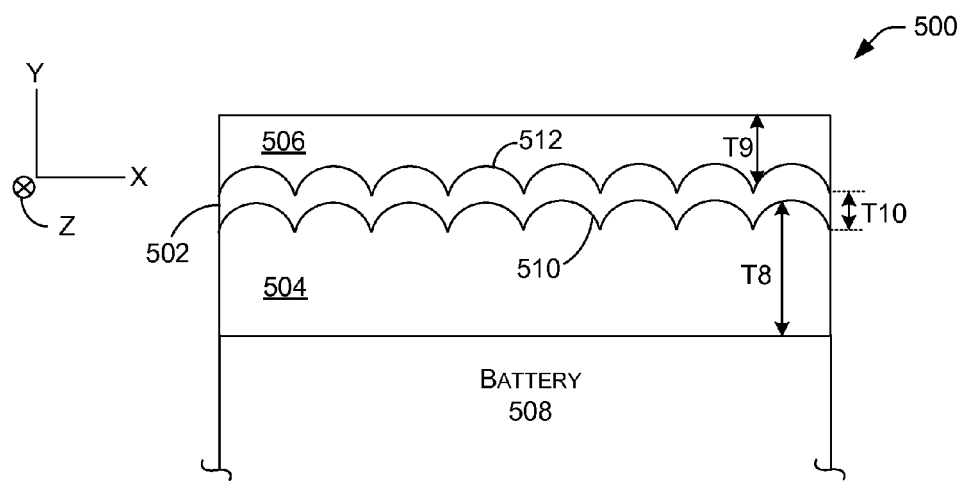
FIG. 5 illustrates a cross-section view of battery packaging material that includes a micro-arched nano-grain metallic film, according to embodiments.

FIG. 5 illustrates a cross-section view of battery packaging material 500 that includes a micro-arched nano-grain metallic film 502, between a first non-conductive film 504 and a second non-conductive film 506, according to embodiments. For example, such non-conductive films may comprise a polymer, ceramic, or paper material, among other possibilities. Reference directions X, Y, and Z are included. The Z-direction is in and out of the drawing. FIG. 5 illustrates a relatively short section of packaging material 500 covering a battery 508 (e.g., or battery cell). For example, in some implementations, a pouch into which battery 508 is inserted may comprise packaging material 500. In other implementations, packaging material 500 may be in the form of a sheet that is wrapped around battery 508 and sealed to enclose the battery. Packaging material 500 performs a number of roles, such as protecting the enclosed battery from moisture, physical shock, punctures, electrical shorts, and so on. Micro-arched nano-grain metallic film 502 may provide a corrugated configuration that adds structural strength as compared to a flat nano-grain metallic film (e.g., 102), such as that illustrated in FIG. 1.

First non-conductive film 504 is adjacent to battery 508, whereas second non-conductive film 506, which may be a polymer material, faces away from the battery. In other embodiments, this arrangement may be inverted so that second non-conductive film 506 is adjacent to the battery and first non-conductive film 504 faces away from the battery. In some implementations, first non-conductive film 504 may comprise a material that is relatively tough, flexible, and chemically resistant to an electrolyte of the battery. Such a material may comprise a polypropylene film, for example. In some implementations, second non-conductive film 506 may comprise a material having desirable barrier properties for preventing oxygen, water, and various particulates from reaching the enclosed battery. Second non-conductive film 506 may be used as a protective layer against abrasion (scratches), punctures, and tears, and may also be used as a printable surface for labeling. Such a material may comprise a nylon film, for example.

Nano-grain metallic film 502 comprises a nano-grain metal or metallic alloy, which may include, among other things, chromium, copper, nickel, and cobalt, or combinations thereof. For example, a Ni—Co alloy may be manufactured into a nano-grain foil or film. Moreover, nano-grain metallic film 502 may include micro-arches aligned in the Z-direction.

Though first non-conductive film 504 and second non-conductive film 506 act as barriers that prevent undesirable material (e.g., oxygen, moisture, etc.) from reaching the enclosed battery, nano-grain metallic film 502 may also contribute to blocking oxygen and moisture ingress to the enclosed battery. Nano-grain metallic film 502 may additionally add strength to packaging material 500 for at least two reasons. First, a nano-grain metallic film is stronger than a similar film that does not comprise nano-grains. Secondly, micro-arches add to the inherent strength of the nano-grain metallic film.

In some example embodiments, a thickness T8 of first non-conductive film 504 and a thickness T9 of second non-conductive film 506 may be in a range from about 20 microns up to about 30 microns. Thickness T10 of nano-grain metallic film 502 may be in a range from about 20 microns up to about 50 microns or more, depending, at least in part, on the application.

In some embodiments, an interface 510 between nano-grain metallic film 502 and first non-conductive film 504 may include an adhesive. An interface 512 between nano-grain metallic film 502 and second non-conductive film 506 may also include an adhesive. In other embodiments, nano-grain metallic film 502 may be electroformed onto first non-conductive film 504 or onto second non-conductive film 506. In this case, the interface involved with electroforming need not include an adhesive.

Figure 6:
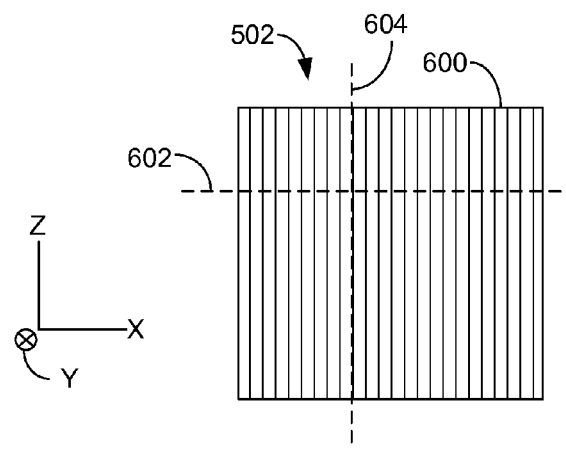
FIG. 6 is a top view of a micro-arched nano-grain metallic film, according to various embodiments.

FIG. 6 is a top view of micro-arched nano-grain metallic film 502, according to various embodiments. Reference directions X, Y, and Z are included. The Y-direction is in and out of the drawing. As mentioned above in the description for FIG. 5, micro-arched nano-grain metallic film 502 is aligned in the Z-direction. That is, each corrugation row 600 individually formed by a micro-arch extends in the Z-direction. In FIG. 6, micro-arched nano-grain metallic film 502 undulates in the Y-direction (e.g., in and out of the drawing). The corrugated shape of micro-arched nano-grain metallic film 502 has a greater stiffness in one direction versus that of another direction. For example, micro-arched nano-grain metallic film 502 has a greater stiffness along the Z-direction as compared to along the X-direction. In other words, bending micro-arched nano-grain metallic film 502 about an axis 602 presents a greater stiffness as compared to bending about an axis 604.

Figure 7:
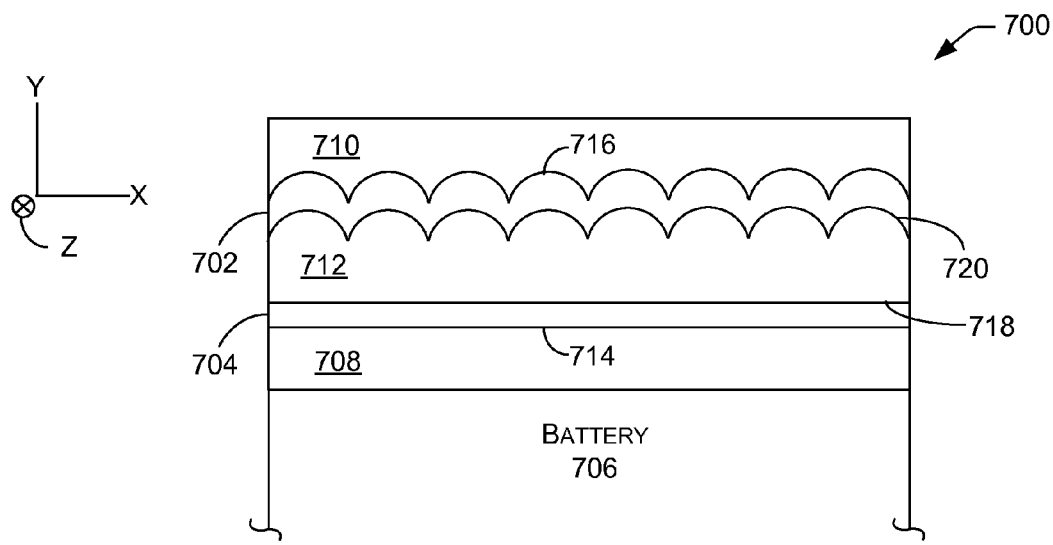
FIG. 7 illustrates a cross-section of battery packaging material that includes multiple micro-arched nano-grain metallic films, according to embodiments.

FIG. 7 illustrates a cross-section of battery packaging material 700 that includes multiple micro-arched nano-grain metallic films 702 and 704, according to embodiments. Reference directions X, Y, and Z are included. The Z-direction is in and out of the drawing. FIG. 7 illustrates a relatively short section of battery packaging material 700 covering a battery 706 (e.g., or battery cell). For example, in some implementations, a pouch into which battery 706 is inserted may comprise packaging material 700. In other implementations, packaging material 700 may be in the form of a sheet that is wrapped around battery 706 and sealed to enclose the battery, such as that illustrated in FIG. 3. Packaging material 700 performs a number of roles, such as protecting the enclosed battery from moisture, physical shock, punctures, electrical shorts, and so on. Micro-arched nano-grain metallic films 702 and 704 may provide a corrugated configuration that adds structural strength as compared to flat nano-grain metallic films (e.g., 102), such as that illustrated in FIG. 1.

A first polymer film 708 is adjacent to the battery, whereas a second polymer film 710, which may be nonconductive and comprise a printable surface, faces away from the battery. In other embodiments, this arrangement may be inverted so that second polymer film 710 is adjacent to the battery and first polymer film 708 faces away from the battery.

Micro-arched nano-grain metallic films 702 and 704 may be separated from one another by a third polymer film 712. In some implementations, first polymer film 708 may comprise a material that is relatively tough, flexible, and chemically resistant to an electrolyte of the battery. Such a material may comprise a polypropylene film, for example. In some implementations, second polymer film 710 may comprise a material having desirable barrier properties for preventing oxygen, water, and various particulates from reaching the enclosed battery. Second polymer film 710 may be used as a protective layer against abrasion (scratches), punctures, and tears, and may also be used as a printable surface for labeling. Such a material may comprise a nylon film, for example. Third polymer film 712 may comprise a polypropylene film, for example.

Nano-grain metallic films 702 and 704 comprise nano-grain metal or a metallic alloy, which may include, among other things, chromium, copper, nickel, and cobalt, or combinations thereof. For example, a Ni—Co alloy may be manufactured into a nano-grain foil or film. Moreover, nano-grain metallic film 702 includes micro-arches aligned in the Z-direction, and nano-grain metallic film 704 includes micro-arches aligned in the X-direction.

Though first polymer film 708, second polymer film 710, and third polymer film 712 act as barriers that prevent undesirable material (e.g., oxygen, moisture, etc.) from reaching the enclosed battery, nano-grain metallic films 702 and 704 may also contribute to blocking oxygen and moisture ingress to the enclosed battery. Each of nano-grain metallic film 702 and 704 may additionally add strength to packaging material 700 for at least several reasons. For example, nano-grain metallic films are stronger than similar films that do not comprise nano-grains. Also, micro-arches add to the inherent strength of the nano-grain metallic film. Additionally, micro-arches aligned perpendicular to one another and stacked upon one another provide a relatively stiff composite. In the particular example embodiment illustrated in FIG. 7, packaging material 700 includes nano-grain metallic film 702 aligned (in the Z-direction) perpendicularly to the alignment (in the X-direction) of nano-grain metallic film 704. The composite structure that includes nano-grain metallic film 702 and nano-grain metallic film 704, and third polymer 712 therebetween, comprises a structure that is relatively stiff along both X and Z-directions. In some implementations, one or more additional nano-grain metallic films may be added to packaging material 700.

In some embodiments, an interface 714 between nano-grain metallic film 704 and first polymer film 708 may include an adhesive. An interface 716 between nano-grain metallic film 702 and second polymer film 710 may also include an adhesive. In other embodiments, nano-grain metallic film 704 may be electroformed onto third polymer film 712 or onto first polymer film 708. Nano-grain metallic film 702 may also be electroformed onto third polymer film 712. For example, in a process of fabricating packaging material 700, nano-grain metallic film 704 may be electroformed onto a first side 718 of third polymer film 712 and nano-grain metallic film 702 may be electroformed onto a second side 720 of third polymer film 712. The resulting composite film, comprising nano-grain metallic film 702, nano-grain metallic film 704, and third polymer film 712 therebetween, may then be laminated (e.g., using an adhesive) to first polymer film 708 and second polymer film 710.

Figures 8A, 8B:
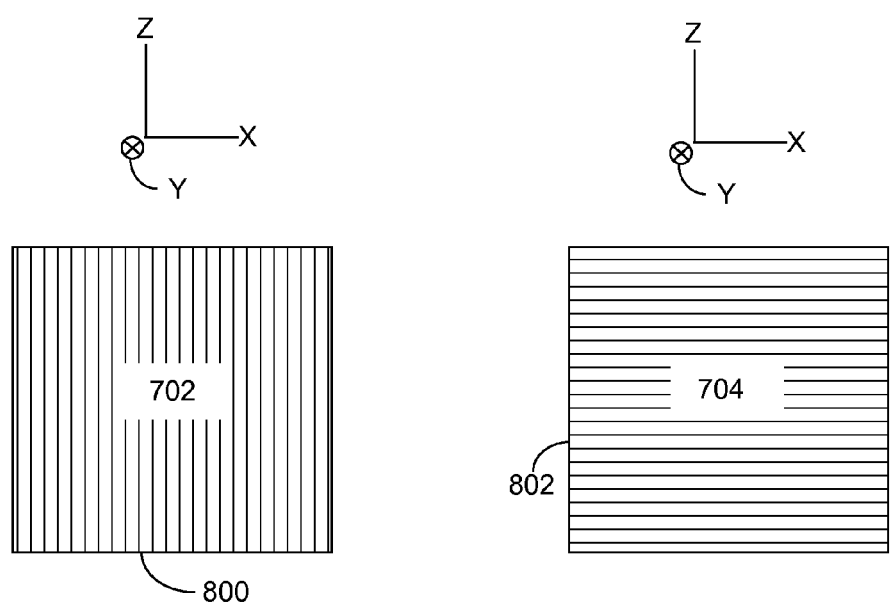
FIGS. 8A and 8B are top views of micro-arched nano-grain metallic films aligned in directions different from one another, according to various embodiments.

FIGS. 8A and 8B are top views of micro-arched nano-grain metallic films 702 and 704 aligned in directions different from one another, according to various embodiments. Reference directions X, Y, and Z are included. The Y-direction is in and out of the drawings. As mentioned above in the description for FIG. 7, micro-arched nano-grain metallic film 702 is aligned in the Z-direction. That is, each corrugation row 800 formed by an individual micro-arch extends in the Z-direction. In FIG. 8A, micro-arched nano-grain metallic film 702 undulates in the Y-direction (e.g., in and out of the drawing). The corrugated shape of micro-arched nano-grain metallic film 702 has a greater stiffness in one direction versus that of another direction. For example, micro-arched nano-grain metallic film 702 has a greater stiffness along the Z-direction as compared to along the X-direction.

Micro-arched nano-grain metallic film 704 is aligned in the X-direction. That is, each corrugation row 802 formed by an individual micro-arch extends in the X-direction. In FIG. 8B, micro-arched nano-grain metallic film 704 undulates in the Y-direction (e.g., in and out of the drawing). The corrugated shape of micro-arched nano-grain metallic film 704 has a greater stiffness in one direction versus that of another direction. For example, micro-arched nano-grain metallic film 704 has a greater stiffness along the X-direction as compared to along the Z-direction.

Accordingly, because micro-arched nano-grain metallic film 704 has a greater stiffness along the X-direction and micro-arched nano-grain metallic film 702 has a greater stiffness along the Z-direction, their composite structure (e.g., micro-arched nano-grain metallic films 702 and 704 stacked on one another) is relatively stiff in both X and Z-directions.

Figure 9:
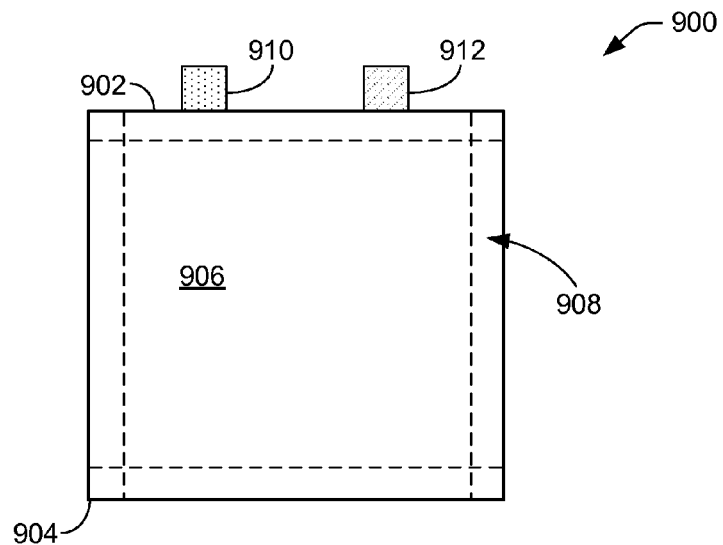
FIG. 9 illustrates a top view of a battery package that includes edges taped with nano-grain metallic film, according to embodiments.

FIG. 9 illustrates a top view of a battery package 900 that includes edges taped with nano-grain metallic film, according to embodiments. For example, battery package 900 may be similar to battery package 328 except that edges 902 and/or corners 904 of packaging material 906, whether sealed or not, may be reinforced with a nano-grain metallic tape 908. Dashed lines in the figure indicate edges of a nano-grain metallic tape 908, which may be folded around edges 902. Cathode connector 910 and anode connector 912 may extend beyond edge 902 of battery package 900.

Figure 10:
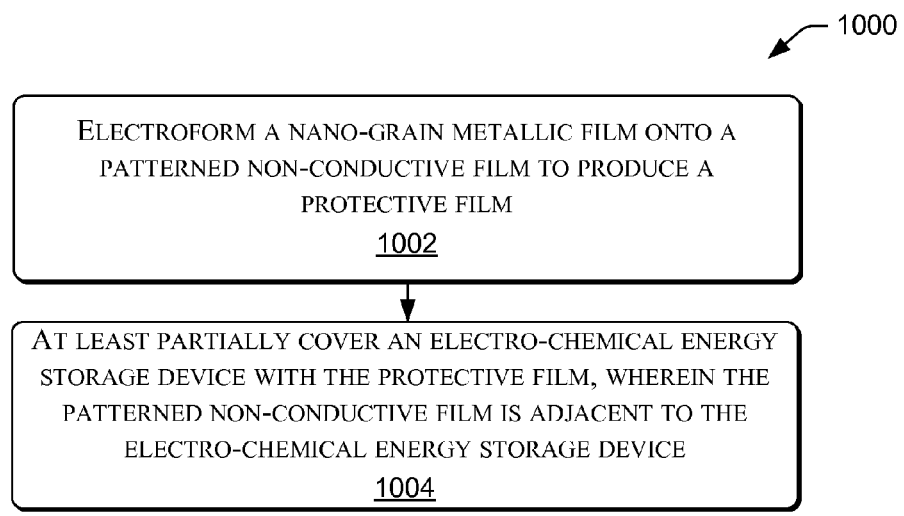
FIG. 10 is a flow diagram of a process for fabricating a battery package, according to various example embodiments.

FIG. 10 is a flow diagram of a process 1000 for fabricating a battery package, according to various example embodiments. For example, process 1000, which may be performed by a fabricator, may be used to fabricate battery packages such as 328 or 900, illustrated in FIGS. 3 and 9. At block 1002, a fabricator may electroform a nano-grain metallic film onto a patterned non-conductive film to produce a protective film. For example, nano-grain metallic film 502 may be electroformed onto patterned first non-conductive film 504, as explained above for the embodiment illustrated in FIG. 5. Accordingly, a protective film may comprise the composite structure that includes nano-grain metallic film 502 and patterned first non-conductive film 504. Second non-conductive film 506 may optionally be laminated onto such a protective film.

In some implementations, the patterned non-conductive (e.g., a polymer) film may include a first side having micro-arches aligned in a first direction and a second side having micro-arches aligned in a second direction substantially perpendicular to the first direction. For example, such a patterned non-conductive film may the same as or similar to third polymer film 710 illustrated in FIG. 7.

In some embodiments, mass production of a nano-grain metallic film may involve fabricating films in a batch-to-batch process. For example, a relatively large nano-grain metallic film or sheet may be electroformed onto large mandrels in controlled electrochemical plating baths. In a particular implementation, a relatively large nano-grain metallic film or sheet may be electroformed onto large mandrels in controlled electrochemical plating baths and "peeled" off continuously and wound into rolls. The rolls of nano-grain metallic film or sheet may then be configured into battery pouches by a lamination process. In some embodiments, nylon or polypropylene layers (e.g., second polymer film 106 and first polymer film 104, respectively, illustrated in FIG. 1) may be micro-imprinted with structural "arches" and then coated with a nano-grain metallic film by an electroforming process, as described below.

At block 1004, the fabricator may at least partially cover an electrochemical energy storage device (e.g., battery) with the protective film. For example, the patterned polymer film may be adjacent to the electrochemical energy storage device. In some implementations, the fabricator may at least partially cover the protective film with a nonconductive film, which may be similar to or the same as second polymer films 106, 506, or 708, for example. Such a nonconductive film may comprise a surface onto which characters and/or graphics may be printed, such as for labelling, for the battery package.

In some embodiments, the presence of a nano-grain metallic film in the battery package may provide a benefit regarding handling the battery package during fabrication, such as during process 1000. In particular, the nano-grain metallic film may be magnetic so that the battery package may be picked up and/or carried during fabrication. In comparison, a battery package that includes aluminum (which is not magnetic) instead of a nano-grain metallic film may not be picked up or handled by magnets during fabrication.

Figure 11:
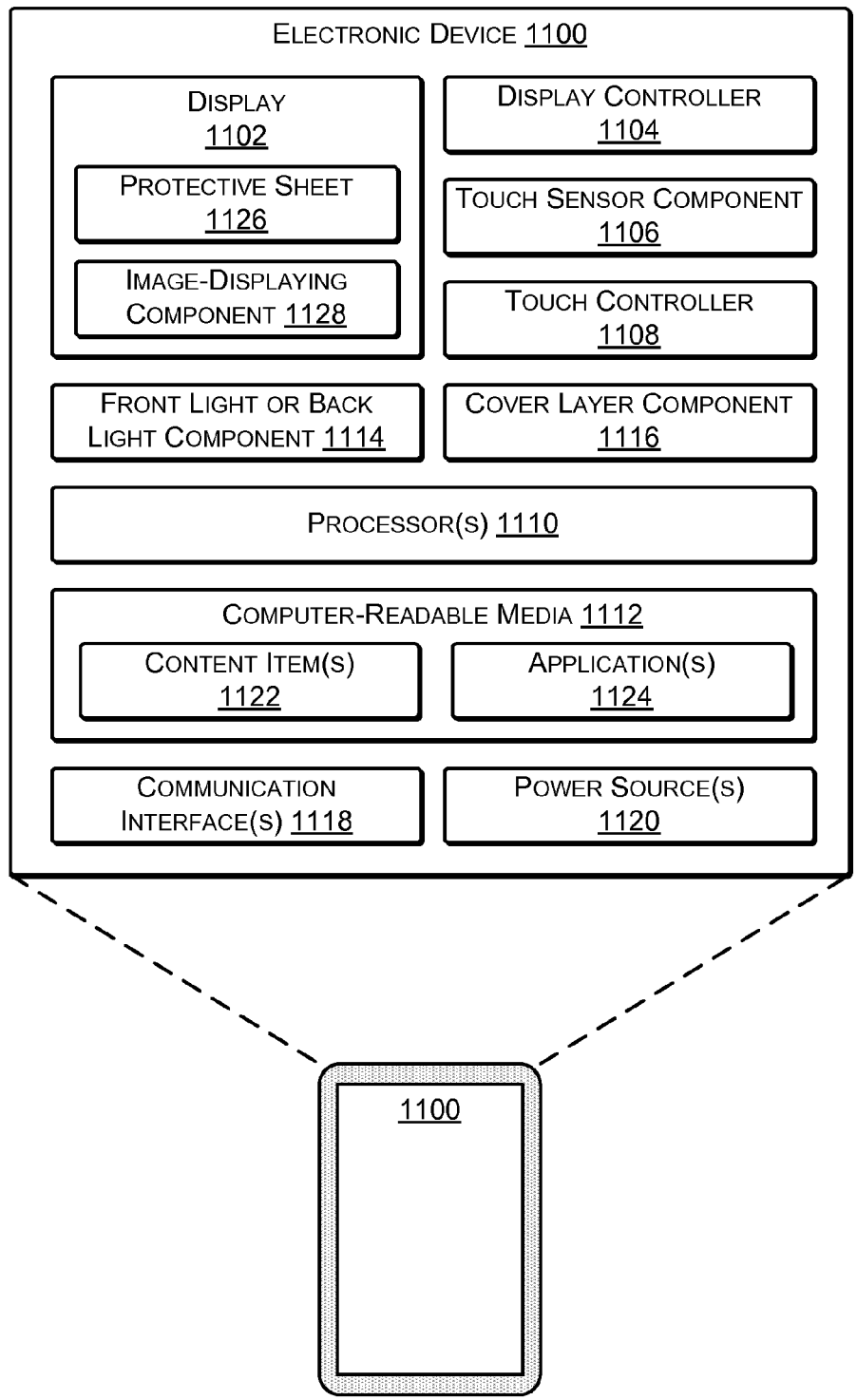
FIG. 11 illustrates an example electronic device that may incorporate a battery package, according to some embodiments.

FIG. 11 illustrates an example electronic device 1100 that may incorporate a battery package, according to some embodiments. Such a battery package, for example, may be the same as or similar to battery packages 328 or 900. The device 1100 may comprise any type of electronic device having a display. For instance, the device 1100 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1100 may be a non-mobile electronic device (e.g., a computer display, a television, etc.). In addition, while FIG. 11 illustrates several example components of the electronic device 1100, it is to be appreciated that the device 1100 may also include other conventional components, such as an operating system, system busses, input/output components, and the like. Further, in other examples, such as in the case of a television or computer monitor, the electronic device 1100 may only include a subset of the components illustrated.

Regardless of the specific implementation of the electronic device 1100, the device 1100 includes a display 1102 and a corresponding display controller 1104. The display 1102 may represent a reflective or transmissive display.

In addition to including the display 1102, FIG. 11 illustrates that some examples of the device 1100 may include a touch sensor component 1106 and a touch controller 1108. In some instances, at least one touch sensor component 1106 resides with, or is stacked on, the display 1102 to form a touch-sensitive display. Thus, the display 1102 may be capable of both accepting user touch input and rendering content in response to or corresponding to the touch input. As several examples, the touch sensor component 1106 may comprise a capacitive touch sensor, a force sensitive resistance (FSR), an interpolating force sensitive resistance (IFSR) sensor, or any other type of touch sensor. In some instances, the touch sensor component 1106 is capable of detecting touches as well as determining an amount of pressure or force of these touches.

FIG. 11 further illustrates that the electronic device 1100 may include one or more processors 1110 and one or more computer-readable media 1112, as well as a front light component 1114 (which may alternatively be a backlight component in the case of a backlit display) for lighting the display 1102, a cover layer component 1116, such as a cover glass or cover sheet, one or more communication interfaces 1118 and one or more power sources 1120 (e.g., an electrochemical energy storage device, such as a battery or battery cell). The communication interfaces 1118 may support both wired and wireless connection to various networks, such as cellular networks, radio, WiFi networks, short range networks (e.g., Bluetooth®), infrared (IR), and so forth.

Depending on the configuration of the electronic device 1100, the computer-readable media 1112 (and other computer-readable media described throughout) is an example of computer storage media and may include volatile and nonvolatile memory. Thus, the computer-readable media 1112 may include, but is not limited to, RAM, ROM, EEPROM, flash memory, or other memory technology, or any other medium that may be used to store computer-readable instructions, programs, applications, media items, and/or data which may be accessed by the electronic device 1100.

The computer-readable media 1112 may be used to store any number of functional components that are executable on the processor 1110, as well as content items 1122 and applications 1124. Thus, the computer-readable media 1112 may include an operating system and a storage database to store one or more content items 1122, such as eBooks, audio books, songs, videos, still images, and the like. The computer-readable media 1112 of the electronic device 1100 may also store one or more content presentation applications to render content items on the device 1100. These content presentation applications may be implemented as various applications 1124 depending upon the content items 1122. For instance, the content presentation application may be an electronic book reader application for rending textual electronic books, an audio player for playing audio books or songs, a video player for playing video, and so forth.

In some instances, the electronic device 1100 may couple to a cover (not illustrated in FIG. 11) to protect the display (and other components in the display stack or display assembly) of the device 1100. In one example, the cover may include a back flap that covers a back portion of the device 1100 and a front flap that covers the display 1102 and the other components in the stack. The device 1100 and/or the cover may include a sensor (e.g., a Hall Effect sensor) to detect if the cover is open (i.e., if the front flap is not atop the display and other components). The sensor may send a signal to the front light component 1114 if the cover is open and, in response, the front light component 1114 may illuminate the display 1102. If the cover is closed, meanwhile, the front light component 1114 may receive a signal indicating that the cover has closed and, in response, the front light component 1114 may turn off.

Furthermore, the amount of light emitted by the front light component 1114 may vary. For instance, upon a user opening the cover, the light from the front light may gradually increase to its full illumination. In some instances, the device 1100 includes an ambient light sensor (not illustrated in FIG. 11) and the amount of illumination of the front light component 1114 may be based at least in part on the amount of ambient light detected by the ambient light sensor. For example, the front light component 1114 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1102 may vary depending on whether the front light component 1114 is on or off, or based on the amount of light provided by the front light component 1114. For instance, the electronic device 1100 may implement a larger default font or a greater contrast if the light is off compared to if the light is on. In some instances, the electronic device 1100 maintains, if the light is on, a contrast ratio for the display that is within a certain defined percentage of the contrast ratio if the light is off.

As described above, the touch sensor component 1106 may comprise a capacitive touch sensor that resides atop the display 1102. In some examples, the touch sensor component 1106 may be formed on or integrated with the cover layer component 1116. In other examples, the touch sensor component 1106 may be a separate component in the stack of the display assembly. The front light component 1114 may reside atop or below the touch sensor component 1106. In some instances, either the touch sensor component 1106 or the front light component 1114 is coupled to a top surface of a protective sheet 1126 of the display 1102. As one example, the front light component 1114 may include a lightguide sheet and a light source (not illustrated in FIG. 11). The lightguide sheet may comprise a substrate (e.g., a transparent thermoplastic such as PMMA or other acrylic), a layer of lacquer and multiple grating elements formed in the layer of lacquer that function to propagate light from the light source towards the display 1102, thus illuminating the display 1102.

The cover layer component 1116 may include a transparent substrate or sheet having an outer layer that functions to reduce at least one of glare or reflection of ambient light incident on the electronic device 1100. In some instances, the cover layer component 1116 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, the protective sheet 1126 may include a similar UV-cured hard coating on the outer surface. The cover layer component 1116 may couple to another component or to the protective sheet 1126 of the display 1102. The cover layer component 1116 may, in some instances, also include a UV filter, a UV-absorbing dye, or the like, for protecting components lower in the stack from UV light incident on the electronic device 1100. In still other examples, the cover layer component 1116 may include a sheet of high-strength glass having an antiglare and/or antireflective coating.

The display 1102 includes the protective sheet 1126 overlying an image-displaying component 1128. For example, the display 1102 may be preassembled to have the protective sheet 1126 as an outer surface on the upper or image-viewing side of the display 1102. Accordingly, the protective sheet 1126 may be integral with and may overlie the image-displaying component 1128. The protective sheet 1126 may be optically transparent to enable a user to view, through the protective sheet 1126, an image presented on the image-displaying component 1128 of the display 1102.

In some examples, the protective sheet 1126 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1126 may include a coating, such as the hard coating described above. For instance, the hard coating may be applied to the outer surface of the protective sheet 1126 before or after assembly of the protective sheet 1126 with the image-displaying component 1128 of the display 1102. In some examples, the hard coating may include a photoinitiator or other reactive species in its composition, such as for curing the hard coating on the protective sheet 1126. Furthermore, in some examples, the protective sheet 1126 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1126, thereby protecting the image-displaying component 1128 from UV light.

While FIG. 11 illustrates a few example components, the electronic device 1100 may have additional features or functionality. For example, the device 1100 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 1100 may reside remotely from the device 1100 in some implementations. In these implementations, the device 1100 may utilize the communication interfaces 1118 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An apparatus comprising:
    an electrochemical energy storage device;
    a non-conductive film at least partially covering the electrochemical energy storage device, wherein the non-conductive film is folded along one or more fold lines; and
    a nano-grain metallic film at least partially covering the non-conductive film, wherein the nano-grain metallic film includes the one or more fold lines extending across an area of the nano-grain metallic film, and wherein a grain size of the nano-grain metallic film along the one or more fold lines is larger than a grain size of the nano-grain metallic film of other portions of the nano-grain metallic film.

2. The apparatus of claim 1, wherein a thickness of the nano-grain metallic film is less than about 25 microns.

3. The apparatus of claim 1, wherein the nano-grain metallic film comprises an undulating micro-arched structure.

4. The apparatus of claim 1, wherein the nano-grain metallic film comprises:
    a first undulating micro-arched structure aligned in a first direction; and
    a second undulating micro-arched structure aligned in a second direction, wherein the second direction is substantially perpendicular to the first direction.

5. The apparatus of claim 4, wherein the non-conductive film comprises:
    a first polymer film; and
    a second polymer film disposed between the first undulating micro-arched structure and the second undulating micro-arched structure.

6. The apparatus of claim 1, wherein the nano-grain metallic film is electroformed to the non-conductive film.

7. The apparatus of claim 1, wherein the grain size of the other portions of the nano-grain metallic film is less than about 40 nanometers.

8. The apparatus of claim 1, wherein:
    the electrochemical energy storage device comprises a cathode electrode layer having a cathode connector extending therefrom, an anode electrode layer having an anode connector extending therefrom, and a nonconductive separator layer between the cathode electrode layer and the anode electrode layer; and the cathode connector and the anode connector protrude through the non-conductive film and the nano-grain metallic film.

9. The apparatus of claim 1, wherein the nano-grain metallic film comprises a reinforcing nano-structure having a repeated shape that is semi-circular, parabolic, hyperbolic, triangular, or sawtooth, and wherein the reinforcing nano-structure is on a nano-scale.

10. The apparatus of claim 1, wherein the nano-grain metallic film comprises one of chromium, copper, nickel, or cobalt.

11. An apparatus comprising:
an electrochemical energy storage device;
a first polymer film at least partially covering the electrochemical energy storage device, wherein the first polymer film is folded along one or more fold lines;
a nano-grain metallic film at least partially covering the first polymer film, wherein the nano-grain metallic film includes the one or more fold lines extending across an area of the nano-grain metallic film, wherein grain size of the nano-grain metallic film along the one or more fold lines is larger than grain size of the nano-grain metallic film of other portions of the area of the nano-grain metallic film; and
a second polymer film at least partially covering the nano-grain metallic film.

12. The apparatus of claim 11, wherein the nano-grain metallic film is electroformed to the first polymer film or the second polymer film.

13. The apparatus of claim 11, wherein at least a portion of the nano-grain metallic film comprises an undulating micro-arched structure.

14. The apparatus of claim 11, wherein:
the electrochemical energy storage device comprises a cathode electrode layer having a cathode connector extending therefrom, an anode electrode layer having an anode connector extending therefrom, and a non-conductive separator layer between the cathode electrode layer and the anode electrode layer; and
the cathode connector and the anode connector protrude through the second polymer film and the nano-grain metallic film.

15. The apparatus of claim 11, wherein the nano-grain metallic film comprises a nano-structure having a repeated semi-circular, parabolic, hyperbolic, triangular, or sawtooth shape.

16. The apparatus of claim 11, wherein the nano-grain metallic film comprises one of chromium, copper, nickel, or cobalt.

* * * * *